US012380830B2

(12) United States Patent
Feng et al.

(10) Patent No.: US 12,380,830 B2
(45) Date of Patent: Aug. 5, 2025

(54) ELECTRONIC DEVICE

(71) Applicant: InnoLux Corporation, Miao-Li County (TW)

(72) Inventors: Yu-Hsin Feng, Miao-Li County (TW); Yu-Tse Lu, Miao-Li County (TW); Fang-Zhi Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/502,218

(22) Filed: Nov. 6, 2023

(65) Prior Publication Data

US 2024/0194114 A1 Jun. 13, 2024

(30) Foreign Application Priority Data

Dec. 13, 2022 (CN) ......................... 202211602527.2

(51) Int. Cl.
*G09G 3/20* (2006.01)

(52) U.S. Cl.
CPC ... *G09G 3/2092* (2013.01); *G09G 2310/0267* (2013.01); *G09G 2310/0289* (2013.01); *G09G 2310/0291* (2013.01); *G09G 2320/041* (2013.01)

(58) Field of Classification Search
CPC ......... G09G 3/2092; G09G 2310/0267; G09G 2310/0289; G09G 2310/0291; G09G 2320/041
See application file for complete search history.

(56) References Cited

U.S. PATENT DOCUMENTS

| | | | | |
|---|---|---|---|---|
| 9,251,755 B2 | 2/2016 | Shin et al. | | |
| 10,777,994 B2 | 9/2020 | Park et al. | | |
| 2012/0133627 A1* | 5/2012 | Moon | G09G 3/3648 | 345/94 |
| 2016/0012790 A1* | 1/2016 | Zheng | G09G 3/3688 | 345/204 |
| 2018/0096646 A1* | 4/2018 | Zeng | G09G 3/2096 | |
| 2019/0081471 A1* | 3/2019 | Park | H02H 3/08 | |
| 2019/0156730 A1* | 5/2019 | Lim | G11C 19/28 | |
| 2020/0074931 A1* | 3/2020 | Yang | G09G 3/3225 | |
| 2022/0208111 A1* | 6/2022 | Baek | G09G 3/32 | |
| 2023/0215376 A1* | 7/2023 | Baek | G09G 3/2096 | 345/204 |
| 2023/0419910 A1* | 12/2023 | Lee | G09G 3/3266 | |

FOREIGN PATENT DOCUMENTS

| | | |
|---|---|---|
| CN | 102789767 A | 11/2012 |
| CN | 109509415 A | 3/2019 |

* cited by examiner

*Primary Examiner* — David Tung
(74) *Attorney, Agent, or Firm* — McClure, Qualey & Rodack, LLP

(57) ABSTRACT

An electronic device includes a level shifter and a gate driver. The level shifter includes a mode controller and a processor. The mode controller outputs first mode information and second mode information. The processor receives a switching signal, the first mode information, and the second mode information. The gate driver is electrically connected to the level shifter. The processor outputs the first mode information or the second mode information to the gate driver according to the switching signal.

15 Claims, 5 Drawing Sheets

ELECTRONIC DEVICE

CROSS REFERENCE TO RELATED APPLICATIONS

This application claims the benefit of China Application No. 202211602527.2, filed on Dec. 13, 2022, the entirety of which is incorporated by reference herein.

BACKGROUND OF THE DISCLOSURE

Field of the Invention

The present invention relates to an electronic device, and, in particular, to an electronic device for reducing operating temperature of operation from source driver.

Description of the Related Art

In existing display technology, the current method to dodge the overloaded screen is to change the scan mode or the output behavior of the source driver. However, when some screens are overloaded by the source driver (SD), and other screens are not overloaded by SD, changing the scanning method (for example, switching to alternate scanning method) can solve the problem of SD overloading in some screens, but it also causes SD overloading in other parts of the screen. Therefore, no matter how the existing method is changed, the screen with SD overloading can be found in the display. In this situation, how to lower the operating temperature of the SD is an urgent problem to be solved.

BRIEF SUMMARY OF THE DISCLOSURE

An embodiment of the present disclosure provides an electronic device. The electronic device includes a level shifter and a gate driver. The level shifter includes a mode controller and a processor. The mode controller outputs first mode information and second mode information. The processor receives a switching signal, the first mode information, and the second mode information. The gate driver is electrically connected to the level shifter. The processor outputs the first mode information or the second mode information to the gate driver according to the switching signal.

BRIEF DESCRIPTION OF THE DRAWINGS

The disclosure can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the disclosure.

DETAILED DESCRIPTION OF THE DISCLOSURE

Figure 1:
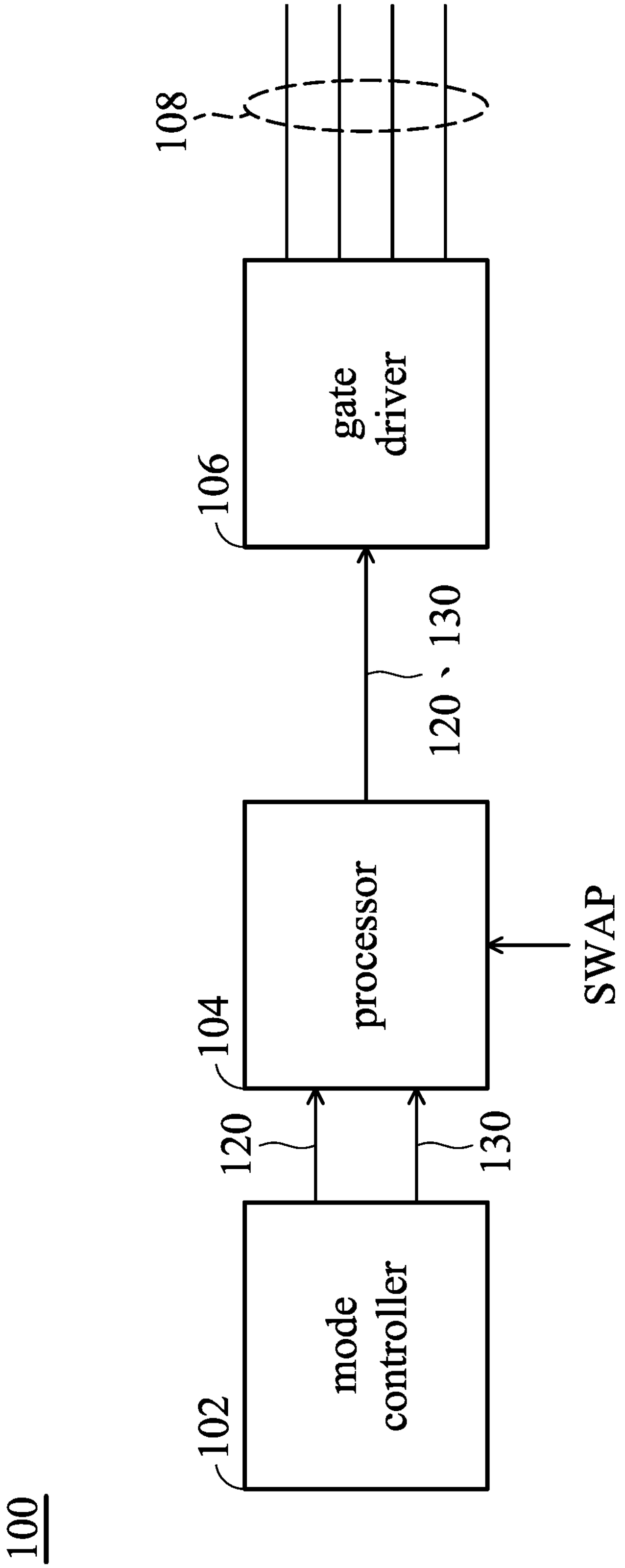
FIG. 1 is a schematic diagram of an electronic device 100 in accordance with some embodiments of the present disclosure.

In order to make the above purposes, features, and advantages of some embodiments of the present disclosure more comprehensible, the following is a detailed description in conjunction with the accompanying drawing.

Certain terms are used throughout the description and following claims to refer to particular components. As one skilled in the art will understand, electronic equipment manufacturers may refer to a component by different names. This document does not intend to distinguish between components that differ in name but not function. It is understood that the words "comprise", "have" and "include" are used in an open-ended fashion, and thus should be interpreted to mean "include, but not limited to . . . ". Thus, when the terms "comprise", "have" and/or "include" used in the present disclosure are used to indicate the existence of specific technical features, values, method steps, operations, units and/or components. However, it does not exclude the possibility that more technical features, numerical values, method steps, work processes, units, components, or any combination of the above can be added.

The directional terms used throughout the description and following claims, such as: "on", "up", "above", "down", "below", "front", "rear", "back", "left", "right", etc., are only directions referring to the drawings. Therefore, the directional terms are used for explaining and not used for limiting the present disclosure. Regarding the drawings, the drawings show the general characteristics of methods, structures, and/or materials used in specific embodiments. However, the drawings should not be construed as defining or limiting the scope or properties encompassed by these embodiments. For example, for clarity, the relative size, thickness, and position of each layer, each area, and/or each structure may be reduced or enlarged.

When the corresponding component such as layer or area is referred to as being "on another component", it may be directly on this other component, or other components may exist between them. On the other hand, when the component is referred to as being "directly on another component (or the variant thereof)", there is no component between them. Furthermore, when the corresponding component is referred to as being "on another component", the corresponding component and the other component have a disposition relationship along a top-view/vertical direction, the corresponding component may be below or above the other component, and the disposition relationship along the top-view/vertical direction is determined by the orientation of the device.

It should be understood that when a component or layer is referred to as being "connected to" another component or layer, it can be directly connected to this other component or layer, or intervening components or layers may be present. In contrast, when a component is referred to as being "directly connected to" another component or layer, there are no intervening components or layers present.

The electrical connection or coupling described in this disclosure may refer to direct connection or indirect connection. In the case of direct connection, the endpoints of the components on the two circuits are directly connected or connected to each other by a conductor line segment, while in the case of indirect connection, there are switches, diodes, capacitors, inductors, resistors, other suitable components, or a combination of the above components between the endpoints of the components on the two circuits, but the intermediate component is not limited thereto.

The words "first", "second", "third", "fourth", "fifth", and "sixth" are used to describe components. They are not used to indicate the priority order of or advance relationship, but only to distinguish components with the same name.

It should be noted that the technical features in different embodiments described in the following can be replaced, recombined, or mixed with one another to constitute another embodiment without departing from the spirit of the present disclosure.

In the present disclosure, the electronic device may include a display device, a backlight device, an antenna device, a sensing device, or a splicing device, etc., but is not limited thereto. The electronic device may be a bendable or flexible electronic device. The display device may be a non-self-luminous display device or a self-luminous display device. The antenna device may be a liquid-crystal antenna device or a non-liquid-crystal antenna device, and the sensing device may be a sensing device for sensing capacitance, light, heat, or ultrasonic waves, but is not limited thereto. The electronic components may include passive and active components, such as capacitors, resistors, inductors, diodes, transistors, and the like. The diodes may include light-emitting diodes or photodiodes. The light-emitting diode may include organic light-emitting diode (OLED), inorganic light-emitting diode, micro-LED, mini-LED, quantum dot light-emitting diode (QLED, QDLED), other suitable materials or a combination of the above materials, but is not limited thereto. The splicing device may be, for example, a splicing display device or a splicing antenna device, but is not limited thereto. In addition, the display device in the electronic device may be a color display device or a monochrome display device, and the shape of the electronic device may be rectangular, circular, polygonal, a shape with curved edges, or other suitable shapes. In addition, the electronic device described below uses, as an example, the sensing of a touch through an embedded touch device, but the touch-sensing method is not limited thereto, and another suitable touch-sensing method can be used provided that it meets all requirements.

FIG. 1 is a schematic diagram of an electronic device 100 in accordance with some embodiments of the present disclosure. As shown in FIG. 1, the electronic device 100 includes a mode controller 102, a processor 104, a gate driver 106, and multiple scan lines 108. In some embodiments, the electronic device 100 may be, for example, a display device, but the present disclosure is not limited thereto. In some embodiments, the mode controller 102 may output first mode information 120 and second mode information 130. The first mode information 120 and the second mode information 130 may be pre-programmed settings. For example, the first mode information 120 may enable the multiple scan lines 108 to perform an alternate scan while in an alternate scan mode, and the second mode information 130 may enable the multiple scan lines 108 to perform a cyclic scan, while in a cyclic scan mode, but the present disclosure is not limited thereto. In some embodiments, the first mode information 120 may enable the multiple scan lines 108 to perform the cyclic scan mode, and the second mode information 130 may enable the multiple scan lines 108 to perform the alternate scan mode. In some embodiments, the mode controller 102 may output the mode information to the processor 104. In some embodiments, the processor 104 is electrically connected between the mode controller 102 and the gate driver 106.

In some embodiments, the mode controller 102 and the processor 104 are disposed in a level shifter. The processor 104 receives a switching signal SWAP, the first mode information 120, and the second mode information 130. The processor 104 outputs the first mode information 120 or the second mode information 130 to the gate driver 106 according to the switching signal SWAP. For example, the processor 104 outputs the first mode information 120 to the gate driver 106 in response to the switching signal SWAP being at a high voltage level. The processor 104 outputs the second mode information 130 to the gate driver 106 in response to the switching signal SWAP being at a low voltage level. In some embodiments, the gate driver 106 is electrically connected between the processor 104 and the multiple scan lines 108. The gate driver 106 outputs the first mode information 120 to the multiple scan lines 108 in response to the switching signal SWAP being at the high voltage level. The gate driver 106 outputs the second mode information 130 to the multiple scan lines 108 in response to the switching signal SWAP being at the low voltage level.

Figure 2:
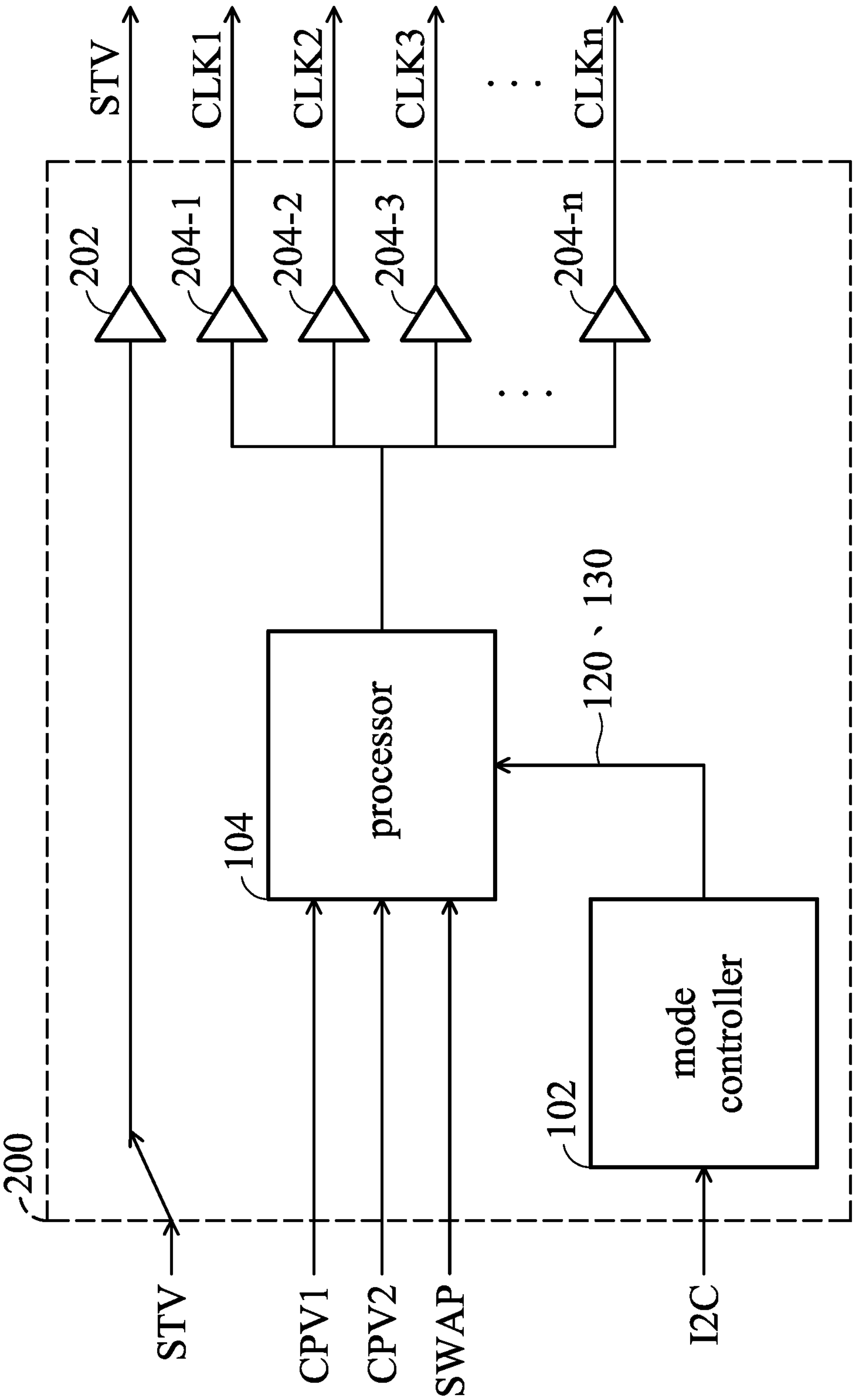
FIG. 2 is a detail schematic diagram of a level shifter 200 in accordance with some embodiments of the present disclosure.

FIG. 2 is a detail schematic diagram of a level shifter 200 in accordance with some embodiments of the present disclosure. As shown in FIG. 2, the level shifter 200 includes the mode controller 102, the processor 104, a buffer 202, a buffer 204-1, a buffer 204-2, a buffer 204-3, . . . , a buffer **204-*n*. In some embodiments of FIG. 2, the level shifter 200 outputs n clock signals (for example, a clock signal CLK1, a clock signal CLK2, a clock signal CLK3, . . . , a clock signal CLKn) to the gate driver 106. n is a positive integer. In FIG. 2, the mode controller 102 receives the setting of respective mode information through an Inter-Integrated circuit ($I^2C$) communication port. For example, the mode controller 102 receives the setting of the first mode information 120 and the second mode information 130 through the $I^2C$ communication port. Then, the mode controller 102 sends the first mode information 120 and the second mode information 130 to the processor 104. In addition to receiving the switching signal SWAP, the processor 104 further receives a first clock control signal CPV1 and a second clock control signal CPV2. The first clock control signal CPV1 and the second clock signal CPV2 are configured to control the clock widths of the multiple clock signals (for example, the clock signal CLK1, the clock signal CLK2, the clock signal CLK3, . . . , the clock signal CLKn). In some embodiments, the processor 104 outputs the first mode information 120 and the second mode information 130 to the gate driver 106 in FIG. 1** according to the switching signal SWAP.

In detail, both the first mode information 120 and the second mode information 130 include the sequential configuration of the clock signal CLK1, the clock signal CLK2, the clock signal CLK3, the clock signal CLKn. The sequential configuration of respective clock signals included in the first mode information 120 is different from the sequential configuration of respective clock signals included in the second mode information 130. In response to the processor 104 outputting the first mode information 120 or the second mode information 130 to the gate driver 106 in FIG. 1, the processor 104 outputs the clock signal CLK1 to the gate driver 106 in FIG. 1 through the buffer 204-1, outputs the clock signal CLK2 to the gate driver 106 in FIG. 1 through the buffer 204-2, outputs the clock signal CLK3 to the gate driver 106 in FIG. 1 through the buffer 204-3, and outputs the clock signal CLKn to the gate driver 106 in FIG. 1 through the buffer 204-*n*. In some embodiments, the level shifter 200 further receives a starting signal STV, and sends the starting signal STV to the gate driver 106 in FIG. 1 through the buffer 202. The starting signal STV is configured to inform the gate driver 106 in FIG. 1 when the level shifter 200 is about to start outputting the clock signal CLK1, the clock signal CLK2, the clock signal CLK3, . . . , or the clock signal CLKn.

Figure 3:
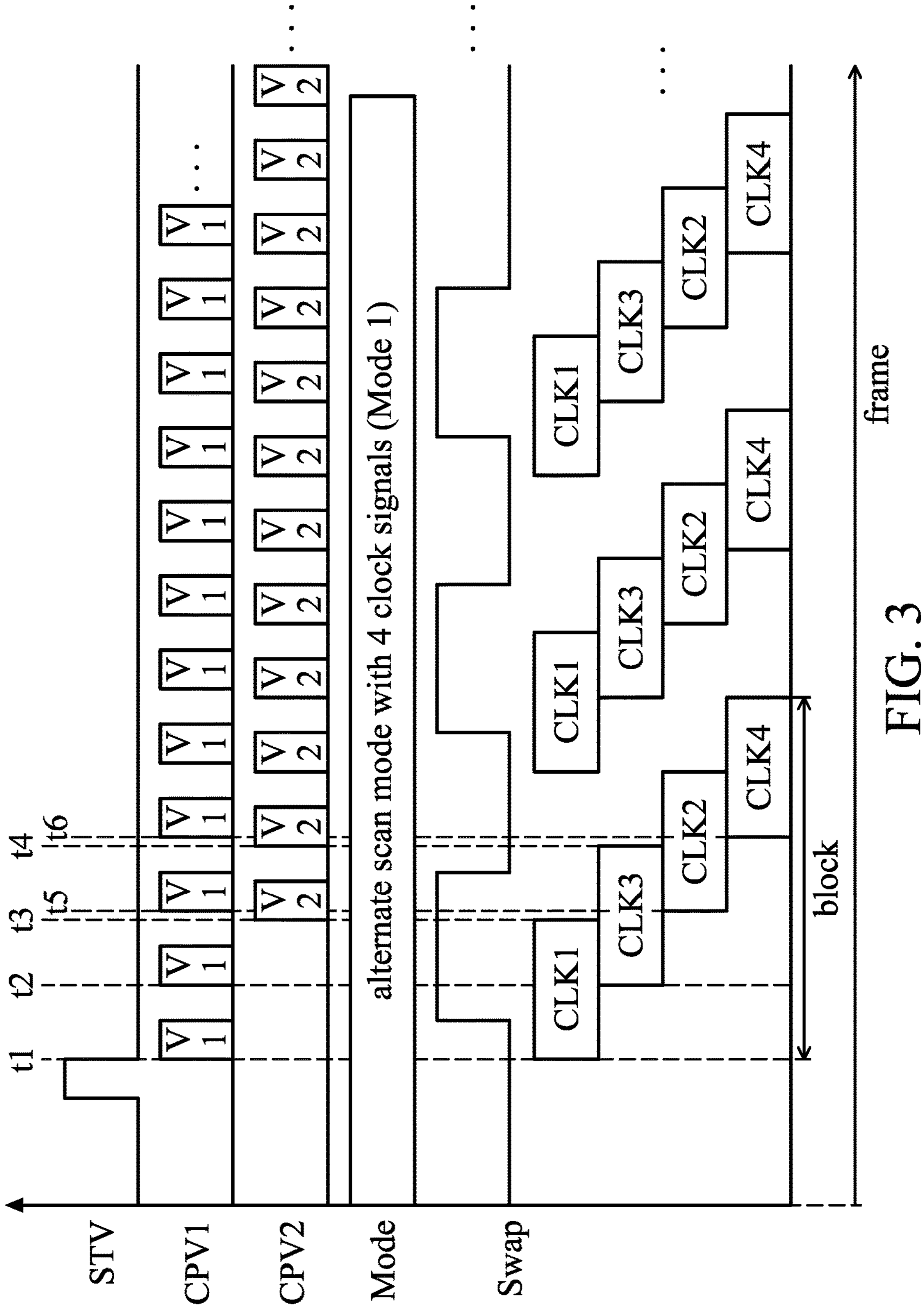
FIG. 3 is a signal sequence diagram of multiple scan lines performing an alternate scan mode in accordance with some embodiments of the present disclosure.

FIG. 3 is a signal sequence diagram of multiple scan lines performing an alternate scan mode in accordance with some embodiments of the present disclosure. As shown in FIG. 3, after the level shifter 200 receives the starting signal STV with the high voltage level, the present disclosure starts to perform scanning by the multiple scan lines. Please refer to the scan lines 108 in FIG. 1 and the clock signal CLK1, the clock signal CLK2, the clock signal CLK3, . . . , and the clock signal CKKn in FIG. 2. Generally, since the scan lines 108 are used by the gate driver 106 to control an active area (active area: AA) in the electronic device 100, the total number of scan lines 108 (i.e., corresponding to a frame in FIG. 3) may be larger than the total number of clock signals (i.e., corresponding to a block in FIG. 3). The first clock control signal CPV1 includes multiple clocks V1, for example, a first clock V1 at time point t1, a second clock V1 at time point t2, a third clock V1 at time point t3, and a fourth clock V1 at time point t4, etc. The multiple clocks V1 control multiple starting time points of the multiple clock signals. The second clock control signal CPV2 includes multiple clocks V2, for example, a first clock V2 at time point t3, a second clock V2 at time point t4, and the subsequent third clock V2 and fourth clock V2, etc. The multiple clocks V2 control multiple ending time points of the multiple clock signals. In some embodiments, the first clock V1 of the first clock control signal CPV1 and the first clock V2 of the second clock control signal CPV2 jointly define the clock width of the clock signal CLK1. For example, the first clock V1 of the first clock control signal CPV1 starts at time point t1 (that is, the starting time point of the clock signal CLK1 is the starting time point t1 of the first clock V1 of the first clock control signal CPV1). The first clock V2 of the second clock control signal CPV2 starts at time point t3 (that is, the ending time point of the clock signal CLK1 is the starting time point t3 of the first clock V2 of the second clock control signal CPV2). Therefore, the clock width of the clock signal CLK1 is between time points t1 and t3. Then, at time point t2, the second clock V1 of the first clock control signal CPV1 is pulled high. At this moment, since the processor 104 detects that the switching signal SWAP is at the high voltage level, the level shifter 200 (that is, the plurality of scan lines 108) performs an alternate scan mode (Mode 1), that is, the sequence of the clock signal CLK3 and the clock signal CLK2 is exchanged. In other words, the second clock V1 of the first clock control signal CPV1 and the second clock V2 of the second clock control signal CPV2 jointly define the clock width of the clock signal CLK3. For example, the second clock V1 of the first clock control signal CPV1 starts at time point t2 (that is, the starting time point of the clock signal CLK3 is the starting time point t2 of the second clock V1 of the first clock control signal CPV1). The second clock V2 of the second clock control signal CPV2 starts at time point t4 (that is, the ending time point of the clock signal CLK3 is the starting time point t4 of the second clock V2 of the second clock control signal CPV2). Therefore, the clock width of the clock signal CLK3 is between time points t2 and t4.

At time point t5, the third clock V1 of the first clock control signal CPV1 is pulled high. At this moment, the processor 104 still detects that the switching signal SWAP is at the high voltage level, so the level shifter 200 performs the alternate scan mode (Mode 1), so that the clock signal CLK2 is pulled high at time point t5. Similarly, at time point t6, the fourth clock V1 of the first clock control signal CPV1 is pulled high. At this moment, The processor 104 detects that the switching signal SWAP is at a low level, and the level shifter 200 does not perform the alternate scan mode (Mode 1), so that the clock signal CLK4 is pulled high at time point t6. Some embodiments in FIG. 3 discloses the alternate scan mode with 3 blocks. In some embodiments of FIG. 3, a frame of the electronic device 100 is composed of 12 scan lines, such as scan lines 1-12. The 4 scan lines of each of the 3 blocks correspond to the 4 clock signals respectively. That is, the clock signal CLK1 is connected to scan line 1, scan line 5, and scan line 9. The clock signal CLK3 is connected to scan line 3, scan line 7, and scan line 11. The clock signal CLK2 is connected to scan line 2, scan line 6, and scan line 10. The clock signal CLK4 is connected to scan line 4, scan line 8, and scan line 12. Therefore, the scanning sequence of the scan lines in some embodiment of FIG. 3 is (scan line 1, scan line 3, scan line 2, scan line 4), (scan line 5, scan line 7, scan line 6, scan line 8), and (scan line 9, scan line 11, scan line 10, scan line 12). In some embodiments, the multiple scan lines 108 performs an alternate scan mode in response to the processor 104 detecting that the switching signal SWAP is at the low voltage level.

In summary, the total number of scan lines included in a frame of the electronic device 100 is M, a frame includes a+1 blocks, and the number of scan lines 108 included in a block is N, and the number of clock signals output by the level shifter 200 is also N. The method to connect the scan lines to the clock signals is shown as the following equation 1.

$$\text{CLK}(1+Y)\text{ is connected to Scan}(aN+1+Y)(Y=0,1,2,\ldots,N-1)(a=0,1,\ldots,M/N-1) \quad \text{equation 1}$$

Scan(aN+1+Y) is the (aN+1+Y)th scan line among the multiple scan lines 108. The clock signal on the scan line Scan(aN+1+Y) is CLK(1+Y). Regardless of whether the scan mode is an alternate scan mode or a cyclic scan mode, the corresponding relationship between the scan lines and the clock signals conforms to equation 1.

Figure 4:
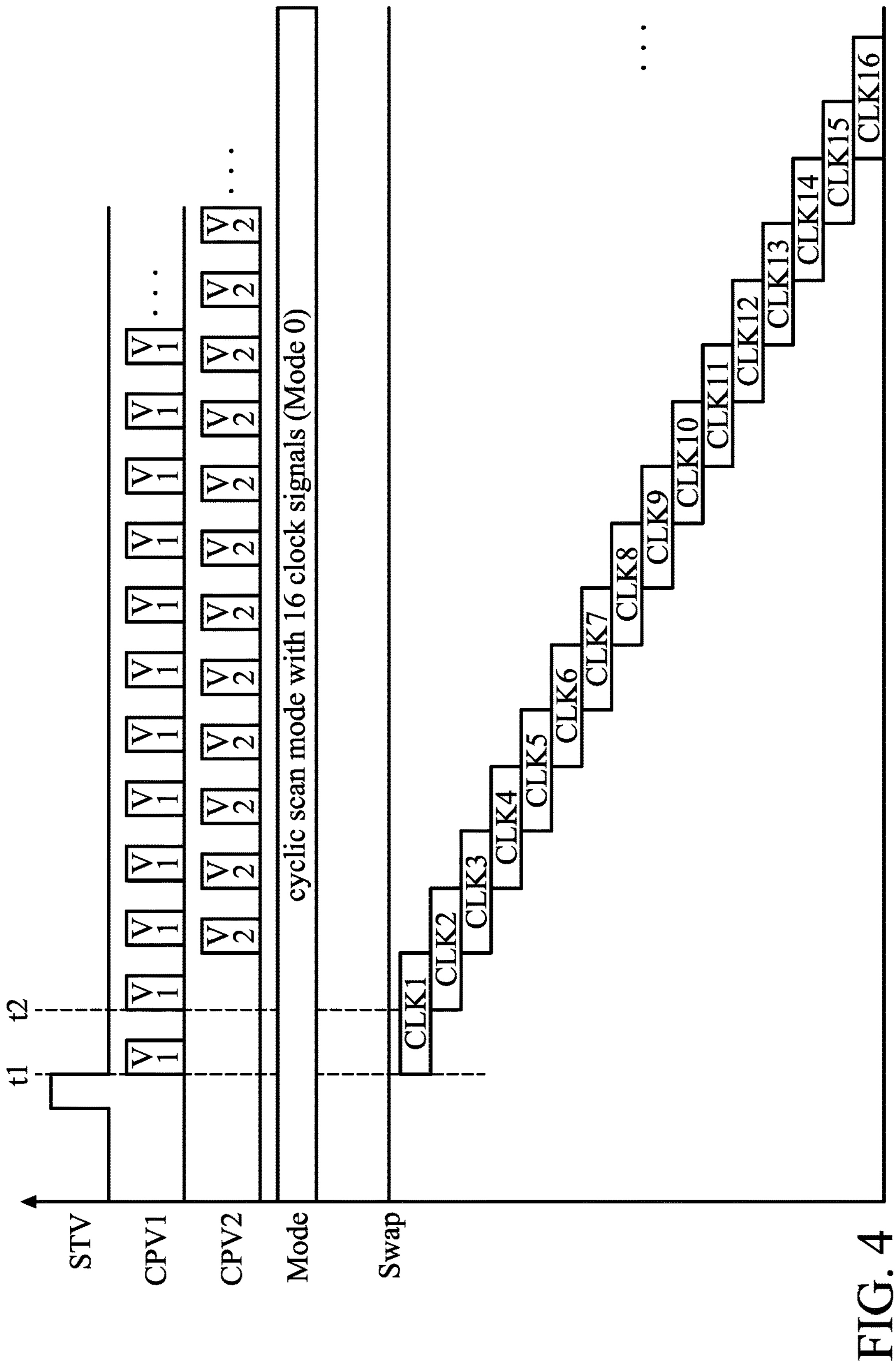
FIG. 4 is a signal sequence diagram of multiple scan lines performing a cyclic scan mode in accordance with some embodiments of the present disclosure.

FIG. 4 is a signal sequence diagram of multiple scan lines performing a cyclic scan mode in accordance with some embodiments of the present disclosure. After the level shifter 200 receives the starting signal STV with the high voltage level, the present disclosure starts to perform scanning by the multiple scan lines. Please refer to FIG. 2 and FIG. 4 at the same time. The level shifter 200 outputs the clock signal CLK1, the clock signal CLK2, the clock signal CLK3, the clock signal CLK4, the clock signal CLK5, the clock signal CLK6, the clock signal CLK7, the clock signal CLK8, the clock signal CLK9, the clock signal CLK10, the clock signal CLK11, the clock signal CLK12, the clock signal CLK13, the clock signal CLK14, the clock signal CLK15, and the clock signal CLK16 according to the switching signal SWAP. In other words, FIG. 4 is equivalent to the case of n=16 in FIG. 2. For example, at time point t1, the first clock V1 of the first clock control signal CPV1 is pulled high. At this moment, the processor 104 detects that the switching signal SWAP is at the low voltage level, and the level shifter 200 performs the cyclic scan mode (Mode 0), so that the level shifter 200 outputs the clock signal CLK1 at time point t1. Similarly, at time point t2, the second clock V1 of the first clock control signal CPV1 is pulled high. At this moment, the processor 104 detects that the switching signal SWAP is at the low voltage level, and the level shifter 200 performs the cyclic scan mode (Mode 0), so that the level shifter 200 outputs the clock signal CLK2 at time point t2.

After time point t2, since the switching signal SWAP is always at the low voltage level, the level shifter 200 performs the cyclic scan mode (Mode 0). That is, the level shifter 200 outputs the clock signal CLK3, the clock signal CLK4, the clock signal CLK5, the clock signal CLK6, the clock signal CLK7, the clock signal CLK8, the clock signal CLK9, the clock signal CLK10, the clock signal CLK11, the clock signal CLK12, the clock signal CLK13, the clock signal CLK14, the clock signal CLK15, and the clock signal CLK16 according to the original sequence. In detail, FIG. 4 shows a cyclic scan mode (Mode 0) with 16 clock signals (CLK1~CLK16) in one block. In some embodiments, a frame of the electronic device 100 is composed of 32 scan lines, and there are 16 clock signals in a block, so a frame includes 2 blocks. The cyclic scan mode of each block is shown in FIG. 4. The 16 scan lines (for example, scan lines 1~16, scan lines 17~32) of each of the 2 blocks correspond to 16 clock signals. M=32 and N=16 are substituted into the equation 1. That is, the clock signal CLK1 is connected to the scan line Scan(1) and the scan line Scan(17). The clock signal CLK2 is connected to the scan line Scan(2) and the scan line Scan(18). The clock signal CLK3 is connected to the scan line Scan(3) and the scan line Scan(19). The scan lines connected from the clock signal CLK4 to the clock signal CLK16 may also be obtained from the equation 1, and will not be repeated here. Therefore, in some embodiments of FIG. 4, the scanning sequence of the scan lines is (scan line 1, scan line 2, scan line 3, scan line 4, scan line 5, scan line 6, scan line 7, scan line 8, scan line 9, scan line 10, scan line 11, scan line 12, scan line 13, scan line 14, scan line 15, scan line 16) and (scan line 17, scan line 18, scan line 19, scan line 20, scan line 21, scan line 22, scan line 23, scan line 24, scan line 25, scan line 26, scan line 27, scan line 28, scan line 29, scan line 30, scan line 31, scan line 32).

In other words, in some embodiments of FIG. 4, the sequence when the multiple scan lines 108 performs the cyclic scan mode (Mode 0) is clock signal CLK1, clock signal CLK2, clock signal CLK3, clock signal CLK4, clock signal CLK5, clock signal CLK6, clock signal CLK7, clock signal CLK8, clock signal CLK9, clock signal CLK10, clock signal CLK11, clock signal CLK12, clock signal CLK13, clock signal CLK14, clock signal CLK15, and clock signal CLK16. After the clock signal CLK16 of the first block is performed, the scanning of the second block is performed, and so on, until the cyclic scan mode of one frame is completed. In some embodiments, the multiple scan lines 108 perform a cyclic scan in response to the processor 104 detecting that the switching signal SWAP is at the high voltage level.

Figure 5:
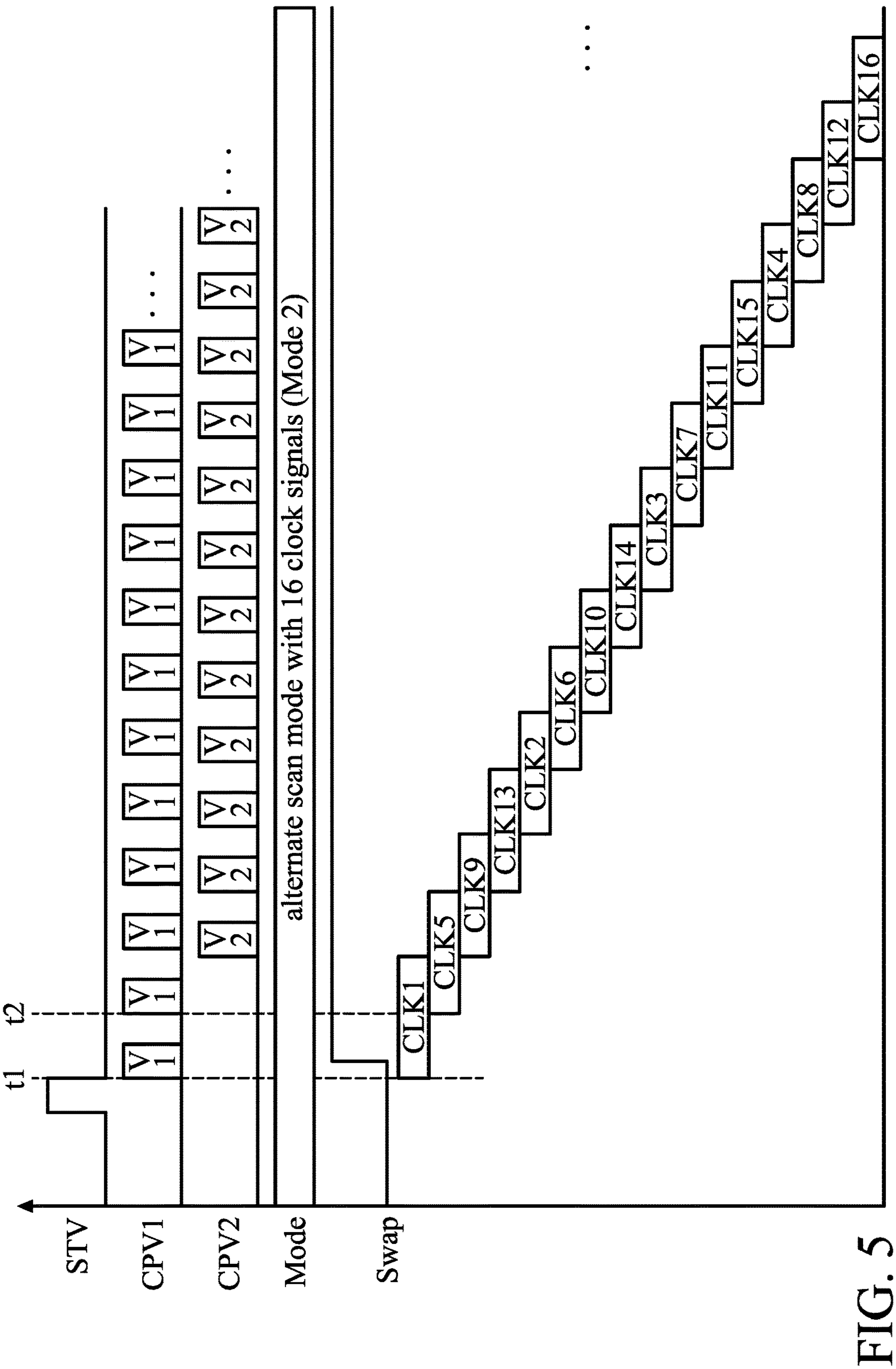
FIG. 5 is a signal sequence diagram of multiple scan lines performing the alternate scan mode in accordance with some embodiments of the present disclosure.

FIG. 5 is a signal sequence diagram of multiple scan lines performing the alternate scan mode in accordance with some embodiments of the present disclosure. After the level shifter 200 receives the starting signal STV with the high voltage level, the present disclosure starts to perform scanning by the multiple scan lines. Please refer to FIG. 2 and FIG. 5 at the same time. The level shifter 200 outputs the clock signal CLK1, the clock signal CLK5, the clock signal CLK9, the clock signal CLK13, the clock signal CLK2, the clock signal CLK6, the clock signal CLK10, the clock signal CLK14, the clock signal CLK3, the clock signal CLK7, the clock signal CLK11, the clock signal CLK15, the clock signal CLK4, the clock signal CLK8, the clock signal CLK12, and the clock signal CLK16. In other words, FIG. 5 is equivalent to the case of n=16 in FIG. 2. For example, at time point t11, the first clock V1 of the first clock control signal CPV1 is pulled up. At this moment, the processor 104 detects that the switching signal SWAP is at the a low voltage level, and the level shifter 200 performs the cyclic scan mode (Mode 0), so that the level shifter 200 outputs the clock signal CLK1 at time point t1. At time point t2, the second clock V1 of the first clock control signal CPV1 is pulled up. At this moment, the processor 104 detects that the switching signal SWAP is at the high voltage level, and the level shifter 200 performs the alternate scan mode (Mode 2), so that the level shifter 200 outputs the clock signal CLK5 at the time point t2.

In some embodiments of FIG. 5, since after time point t2, the switching signal SWAP is always at the high voltage level, the level shifter 200 still continues to perform the alternate scan mode (Mode 2) after time point t2, so that the level shifter 200 (for example, according to the first mode information 120 in FIG. 1) outputs the clock signal CLK9, the clock signal CLK13, the clock signal CLK2, the clock signal CLK6, the clock signal CLK10, the clock signal CLK14, the clock signal CLK3, the clock signal CLK7, the clock signal CLK11, the clock signal CLK15, the clock signal CLK4, the clock signal CLK8, the clock signal CLK12, and the clock signal CLK16. In some embodiments, the multiple scan lines 108 perform an alternate scan in response to the processor 104 detecting that the switching signal SWAP is at the low voltage level.

In some embodiments, the total number of scan lines included in the electronic device 100 is M, a frame includes a+1 blocks, and the number of scan lines 108 included in one block is N. In some embodiments, when N<=4, the sequence in which the multiple scan lines 108 performs the alternate scan mode is shown as following equation 2 and equation 3.

$$\text{First cycle: Scan}(aN+1+2Y)(Y=0,1,2,\ldots,N/2-1)\quad(a=0,\ldots,M/N-1)\qquad\text{equation 2}$$

$$\text{Second cycle: Scan}(aN+2+2Y)(Y=0,1,2,\ldots,N/2-1)\quad(a=0,\ldots,M/N-1)\qquad\text{equation 3}$$

Scan(aN+1+2Y) is the (aN+1+2Y)th scan line among the multiple scan lines 108. Scan(aN+2+2Y) is the (aN+2+2Y) th scan line among the multiple scan lines 108.

The clock signal on the scan line Scan(aN+1+2Y) is CLK(1+2Y). The clock signal on the scan line Scan(aN+2+2Y) is CLK(2+2Y). In some embodiments of FIG. 3, in the present disclosure, M=12 and N=4 are substituted into equation 2 and equation 3, and a=0~2 and Y=0~1 can be obtained. The multiple scan lines in the electronic device 100 performs the alternate scan mode in response to the processor 104 detecting that the switching signal SWAP is at the high voltage level. When a=0, the scanning of the first block is performed. In the first cycle of a=0, Y=0 and Y=1 are substituted to obtain the scan line Scan(1) and the scan line Scan(3). Therefore, in the first cycle of a=0, the scanning of the scan line Scan(1) (connected to the clock signal CLK1) and the scanning of the scan line Scan(3) (connected to the clock signal CLK3) are performed sequentially. In the second cycle of a=0, Y=0 and Y=1 are substituted to obtain the scan line Scan(2) and the scan line Scan(4). Therefore, in the second cycle of a=0, the scanning of the scan line Scan(2) (connected to the clock signal CLK2) and the scanning of the scan line Scan(4) (connected to the clock signal CLK4) are performed sequentially. At this moment, the scanning of the first block is complete. Then, the scanning of the second block is performed (that is, a=1). In the first cycle of a=1, Y=0 and Y=1 are substituted to obtain the scan line Scan(5) and the scan line Scan(7). In the second cycle of a=1, Y=0 and Y=1 are substituted to obtain the scan line Scan(6) and the scan line Scan(8). Therefore, the second block sequentially performs the scanning of the scan line Scan(5) (connected to the clock signal CLK1), the scanning of the scan line Scan(7) (connected to the clock signal CLK3), the scanning of the scan line Scan(6) (connected to the clock signal CLK2), and the scanning of the scan line Scan(8) (connected to the clock signal CLK4). At this moment, the scanning of the second block is complete. Finally, the scanning of the third block is performed (that is, a=2). From the above concepts and so on, the third block sequentially performs the scanning of the scan line Scan(9) (connected to the clock signal CLK1), the scanning of the scan line Scan(11) (connected to the clock signal CLK3), the scanning of the scan line Scan(10) (connected to the clock signal CLK2), and the scanning of the scan line Scan(12) (connected to the clock signal CLK4).

In some embodiments, the total number of scan lines included in the electronic device 100 is M, a frame includes a+1 blocks, and the number of scan lines 108 included in one block is N. In some embodiments, when N>4, the sequence in which the multiple scan lines 108 performs the alternate scan mode is shown as following equation 4, equation 5, equation 6, and equation 7.

$$\text{First cycle: Scan}(aN+1+4Y)(Y=0,1,2,\ldots,N/4-1)\ (a=0,\ldots,M/N-1) \quad \text{equation 4}$$

$$\text{Second cycle: Scan}(aN+2+4Y)(Y=0,1,2,\ldots,N/4-1)\ (a=0,\ldots,M/N-1) \quad \text{equation 5}$$

$$\text{Third cycle: Scan}(aN+3+4Y)(Y=0,1,2,\ldots,N/4-1)\ (a=0,\ldots,M/N-1) \quad \text{equation 6}$$

$$\text{Fourth cycle: Scan}(aN+4+4Y)(Y=0,1,2,\ldots,N/4-1)\ (a\text{-}0,\ldots,M/N-1) \quad \text{equation 7}$$

Scan(aN+1+4Y) is the (aN+1+4Y)th scan line among the multiple scan lines 108. Scan(aN+2+4Y) is the (aN+2+4Y) th scan line among the multiple scan lines 108. Scan(aN+3+4Y) is the (aN+3+4Y)th scan line among the multiple scan lines 108. Scan(aN+4+4Y) is the (aN+4+4Y)th scan line among the multiple scan lines 108.

The clock signal on the scan line Scan(aN+1+4Y) is CLK(1+4Y). The clock signal on the scan line Scan(aN+2+4Y) is CLK(2+4Y). The clock signal on the scan line Scan(aN+3+4Y) is CLK(3+4Y). The clock signal on the scan line Scan(aN+4+4Y) is CLK(4+4Y). For example, in some embodiments, in the present disclosure, M=16 and N=8 are substituted into equation 4, equation 5, equation 6, and equation 7, and a=0~1 and Y=0~1 can be obtained. The multiple scan lines in the electronic device 100 performs the alternate scan mode in response to the processor 104 detecting that the switching signal SWAP is at the high voltage level. When a=0, the scanning of the first block is performed. In the first cycle of a=0, Y=0 and Y=1 are substituted to obtain the scan line Scan(1) and the scan line Scan(5). In the second cycle of a=0, Y=0 and Y=1 are substituted to obtain the scan line Scan(2) and the scan line Scan(6). In the third cycle of a=0, Y=0 and Y=1 are substituted to obtain the scan line Scan(3) and the scan line Scan(7). In the fourth cycle of a=0, Y=0 and Y=1 are substituted to obtain the scan line Scan(4) and the scan line Scan(8). As we can see, the first block sequentially performs the scanning of the scan line Scan(1) (connected to the clock signal CLK1), the scanning of the scan line Scan(5) (connected to the clock signal CLK5), the scanning of the scan line Scan(2) (connected to the clock signal CLK2), the scanning of the scan line Scan(6) (connected to the clock signal CLK6), the scanning of the scan line Scan(3) (connected to the clock signal CLK3), the scanning of the scan line Scan(7) (connected to the clock signal CLK7), the scanning of the scan line Scan(4) (connected to the clock signal CLK4), and the scanning of the scan line Scan(8) (connected to the clock signal CLK8). Then, the scanning of the second block is performed (that is, a=1). From the above concepts and so on, the second block sequentially performs the scanning of the scan line Scan(9) (connected to the clock signal CLK1), the scanning of the scan line Scan(13) (connected to the clock signal CLK5), the scanning of the scan line Scan(10) (connected to the clock signal CLK2), the scanning of the scan line Scan(14) (connected to the clock signal CLK6), the scanning of the scan line Scan(11) (connected to the clock signal CLK3), the scanning of the scan line Scan(15) (connected to the clock signal CLK7), the scanning of the scan line Scan(12) (connected to the clock signal CLK6), and the scanning of the scan line Scan(16) (connected to the clock signal CLK8).

FIG. 5 shows an alternate scan mode (Mode 2) with 16 clock signals (CLK1~CLK16) in one block. In some embodiments, a frame of the electronic device 100 is composed of 32 scan lines, and there are 16 clock signals in a block. A frame includes 2 blocks, and the alternate scan mode of each block is shown in FIG. 5. M=32 and N=16 are substituted into equation 4, equation 5, equation 6, and equation 7, and a=0~1 and Y=0~3 can be obtained. The multiple scan lines in the electronic device 100 performs the alternate scan mode in response to the processor 104 detecting that the switching signal SWAP is at the high voltage level. When a=0, the scanning of the first block is performed. In the first cycle of a=0, Y=0~3 are substituted to obtain the scan line Scan(1), the scan line Scan(5), the scan line Scan(9), and the scan line Scan(13). In the second cycle of a=0, Y=0~3 are substituted to obtain the scan line Scan(2), the scan line Scan(6), the scan line Scan(10), and the scan line Scan(14). In the third cycle of a=0, Y=0~3 are substituted to obtain the scan line Scan(3), the scan line Scan(7), the scan line Scan(11), and the scan line Scan(15). In the fourth cycle of a=0, Y=0~3 are substituted to obtain the scan line Scan(4), the scan line Scan(8), the scan line Scan(12), and the scan line Scan(16).

As we can see, the first block sequentially performs the scanning of the scan line (1) (connected to the clock signal CLK1), the scanning of the scan line (5) (connected to the clock signal CLK5), the scanning of the scan line (9) (connected to the clock signal CLK9), the scanning of the scan line (13) (connected to the clock signal CLK13), the scanning of the scan line (2) (connected to the clock signal CLK2), the scanning of the scan line (6) (connected to the clock signal CLK6), the scanning of the scan line (10) (connected to the clock signal CLK10), the scanning of the scan line (14) (connected to the clock signal CLK14), the scanning of the scan line (3) (connected to the clock signal CLK3), the scanning of the scan line (7) (connected to the clock signal CLK7), the scanning of the scan line (11) (connected to the clock signal CLK11), the scanning of the scan line (15) (connected to the clock signal CLK15), the scanning of the scan line (4) (connected to the clock signal CLK4), the scanning of the scan line (8) (connected to the clock signal CLK8), the scanning of the scan line (12) (connected to the clock signal CLK12), and the scanning of the scan line (16) (connected to the clock signal CLK16). Then, the scanning of the second block is performed (that is, a=1). From the above concepts and so on, the second block sequentially performs the scanning of the scan line Scan(17) (connected to the clock signal CLK1), the scanning of the scan line Scan(21) (connected to the clock signal CLK5), the scanning of the scan line Scan(25) (connected to the clock signal CLK9), the scanning of the scan line Scan(29) (connected to the clock signal CLK13), the scanning of the scan line Scan(18) (connected to the clock signal CLK2), the scanning of the scan line Scan(15) (connected to the clock signal CLK7), the scanning of the scan line Scan(26) (connected to the clock signal CLK10), the scanning of the scan line Scan(30) (connected to the clock signal CLK14), the scanning of the scan line Scan(19) (connected to the clock signal CLK3), the scanning of the scan line Scan(23) (connected to the clock signal CLK7), the scanning of the scan line Scan(27) (connected to the clock signal CLK11), the scanning of the scan line Scan(31) (connected to the clock signal CLK15), the scanning of the scan line Scan(20) (connected to the clock signal CLK4), the scanning of the scan line Scan(24) (connected to the clock signal CLK8), the scanning of the scan line Scan(28) (connected to the clock signal CLK12), and the scanning of the scan line Scan(32) (connected to the clock signal CLK16). Table 1 is a statistical table of output clock signals corresponding to the number of scan lines.

TABLE 1

| The number of scan lines 108 included in a block (N) | First cycle scanning sequence | Second cycle scanning sequence | Third cycle scanning sequence | Fourth cycle scanning sequence |
|---|---|---|---|---|
| 4 (interval of clock signal number is 2) | CLK1, CLK3 | CLK2, CLK4 | NA | NA |
| 8 (interval of clock signal number is 4) | CLK1, CLK5 | CLK2, CLK6 | CLK3, CLK7 | CLK4, CLK8 |
| 16 (interval of clock signal number is 4) | CLK1, CLK5, CLK9, CLK13 | CLK2, CLK6, CLK10, CLK14 | CLK3, CLK7, CLK11, CLK15 | CLK4, CLK8, CLK12, CLK16 |
| 32 (interval of clock signal number is 4) | CLK1, CLK5, CLK9, CLK13, CLK17, CLK21, CLK25, CLK29 | CLK2, CLK6, CLK10, CLK14, CLK18, CLK22, CLK26, CLK30 | CLK3, CLK7, CLK11, CLK15, CLK19, CLK23, CLK27, CLK31 | CLK4, CLK8, CLK12, CLK16, CLK20, CLK24, CLK28, CLK32 |

As shown in Table 1, please refer to FIG. 1 at the same time, when the number of scan lines 108 per block is 4, and the processor 104 detects that the switching signal SWAP is at the high voltage level, the sequence when the multiple scan lines 108 perform the alternate scan mode is the clock signal CLK1, the clock signal CLK3, the clock signal CLK2, and the clock signal CLK4 (as shown in FIG. 3). When the number of scan lines 108 per block is 8, and the processor 104 detects that the switching signal SWAP is at the high voltage level, the sequence when the multiple scan lines 108 perform the alternate scan mode is the clock signal CLK1, the clock signal CLK5, the clock signal CLK2, the clock signal CLK6, the clock signal CLK3, the clock signal CLK7, the clock signal CLK4, and the clock signal CLK8. When the number of scan lines 108 per block is 16, and the processor 104 detects that the switching signal SWAP is at the high voltage level, the sequence when the multiple scan lines 108 perform the alternate scan mode is the clock signal CLK1, the clock signal CLK5, the clock signal CLK9, the clock signal CLK13, the clock signal CLK2, the clock signal CLK6, the clock signal CLK10, the clock signal CLK14, the clock signal CLK3, the clock signal CLK7, the clock signal CLK11, the clock signal CLK15, the clock signal CLK4, the clock signal CLK8, the clock signal CLK12, and the clock signal CLK16.

When the number of scan lines 108 per block is 32, and the processor 104 detects that the switching signal SWAP is at the high voltage level, the sequence when the multiple scan lines 108 perform the alternate scan mode is the clock signal CLK1, the clock signal CLK5, the clock signal CLK9, the clock signal CLK13, the clock signal CLK17, the clock signal CLK21, the clock signal CLK25, the clock signal CLK29, the clock signal CLK2, the clock signal CLK6, the clock signal CLK10, the clock signal CLK14, the clock signal CLK18, the clock signal CLK22, the clock signal CLK26, the clock signal CLK30, the clock signal CLK3, the clock signal CLK7, the clock signal CLK11, the clock signal CLK15, the clock signal CLK19, the clock signal CLK23, the clock signal CLK27, the clock signal CLK31, the clock signal CLK4, the clock signal CLK8, the clock signal CLK12, the clock signal CLK16, the clock signal CLK20, the clock signal CLK24, the clock signal CLK28, and the clock signal CLK32. In some embodiments, the multiple scan lines 108 performs an alternate scan mode in response to the processor 104 detecting that the switching signal SWAP is at the low voltage level.

When the electronic device 100 of the present disclosure scans each frame, the processor 104 outputs the first mode information 120 or the second mode information 130 to the gate driver 106 according to the switching signal SWAP. Through the regulation of the switching signal SWAP, the alternate scan mode and the cyclic scan mode can be used in combination in response to the electronic device 100 performing scanning for different frames. For example, when the electronic device 100 scans the first frame and the second frame, the processor 104 outputs the first mode information 120 to the gate driver 106 according to the switching signal SWAP. When the electronic device 100 successively scans the third frame and the fourth frame, the processor 104 outputs the second mode information 130 to the gate driver 106 according to the switching signal SWAP. The first mode information 120 enables the multiple scan lines 108 to perform an alternate scan, and the second mode information 130 enables the multiple scan lines 108 to perform a cyclic scan. In some embodiments, the first mode information 120 enables the multiple scan lines 108 to perform a cyclic scan, and the second mode information 130 enables the multiple scan lines 108 to perform an alternate scan. In some embodiments, when the electronic device 100 performs the scanning of the first frame, the processor 104 outputs the first mode information 120 to the gate driver 106. When the electronic device 100 performs the scanning of the second frame, the processor 104 outputs the second mode information 130 to the gate driver 106. When the electronic device 100 performs the scanning of the third frame, the processor 104 outputs the first mode information 120 to the gate driver 106. When the electronic device 100 performs the scanning of the fourth frame, the processor 104 outputs the second mode information 130 to the gate driver 106, but the present disclosure is not limited thereto. The processor 104 receives the switching signal SWAP with different voltage levels, and correspondingly outputs different mode information to the gate driver 106, so that the multiple scan lines 108 perform different scanning methods in different frames. With this design, the overloaded condition of the source driver SD of the electronic device 100 can be averaged with the non-overloaded condition. Therefore, the operating temperature of the source driver SD can be effectively reduced to prevent the operating temperature of the source driver SD from being maintained at a high temperature.

When the electronic device 100 of the present disclosure performs the scanning of multiple frames, the alternate scan mode and the cyclic scan mode can be used in combination, which can effectively reduce the chance of overloading the source driver, so that the operating temperature of the source driver can be effectively reduced, thereby achieving the purpose of energy saving.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:

a level shifter, comprising:

a mode controller, configured to output first mode information and second mode information; and a processor, configured to receive a switching signal, the first mode information, and the second mode information;

a gate driver, electrically connected to the level shifter; and multiple scan lines, electrically connected to the gate driver, wherein the multiple scan lines comprise:

a first scan line;

a second scan line not adjacent to the first scan line; and a third scan line, located between the first scan line and the second scan line and adjacent to the first scan line and the second scan line;

wherein the processor outputs the first mode information or the second mode information to the gate driver according to the switching signal, and the gate driver outputs the first mode information or the second mode information to the multiple scan lines, wherein the first mode information enables the multiple scan lines to perform an alternate scan with a first scanning sequence, the second mode information enables the multiple scan lines to perform a cyclic scan with a second scanning sequence, and the first scanning sequence is different from the second scanning sequence;

wherein the multiple scan lines perform the alternate scan while in an alternate scan mode in response to the gate driver outputting the first mode information, and the first scanning sequence of the alternate scan comprises scanning the first scan line first, followed by scanning the second scan line:

wherein the multiple scan lines perform the cyclic scan mode in response to the gate driver outputting the second mode information, and the second scanning sequence of the cyclic scan comprises scanning the first line first, followed by scanning a third scan line, and then scanning the second scan line.

2. The electronic device as claimed in claim 1, wherein the processor is further configured to receive a first clock control signal and a second clock control signal, and the first clock control signal or the second clock control signal comprises multiple clocks; wherein the first clock control signal and the second clock control signal are configured to control clock widths of multiple clock signals output by the multiple scan lines.

3. The electronic device as claimed in claim 2, wherein the multiple clock signals of the first clock control signal are configured to control multiple starting time points of the multiple clock signals.

4. The electronic device as claimed in claim 2, wherein the multiple clock signals of the second clock control signal are configured to control multiple ending time points of the multiple clock signals.

5. The electronic device as claimed in claim 2, wherein the first mode information and the second mode information comprise a sequential configuration of the multiple clock signals.

6. The electronic device as claimed in claim 1, wherein the gate driver outputs the first mode information to the multiple scan lines in response to the switching signal being at a high voltage level.

7. The electronic device as claimed in claim 1, wherein the gate driver outputs the second mode information to the multiple scan lines in response to the switching signal being at a low voltage level.

8. The electronic device as claimed in claim 1, wherein the level shifter is further configured to receive a starting signal, and send the starting signal to the gate driver.

9. The electronic device as claimed in claim 1, wherein the level shifter further comprises:

a buffer, configured to receive a starting signal, and to send the starting signal to the gate driver; and a buffer group, comprising multiple buffers, configured to receive multiple clock signals from the processor, and to send the multiple clock signals to the gate driver.

10. The electronic device as claimed in claim 9, wherein the starting signal is configured to inform the gate driver when the level shifter starts to output the multiple clock signals.

11. The electronic device as claimed in claim 9, wherein the number of multiple buffers in the buffer group is equal to the number of multiple clock signals.

12. The electronic device as claimed in claim 1, wherein the level shifter further comprises:

a communication port, configured to receive settings for the first mode information and the second mode information.

13. The electronic device as claimed in claim 12, wherein the communication port is an Inter-Integrated circuit (I2C) communication port.

14. The electronic device as claimed in claim 1, further comprising:

a frame, composed of the multiple scan lines;
wherein the frame comprises multiple blocks.

15. The electronic device as claimed in claim 1, wherein the multiple scan lines perform the alternate scan mode and the cyclic scan mode in combination in response to the electronic device performing different frame scanning.

* * * * *